Nov. 27, 1928.
C. A. ANDERSON
1,693,427
ADJUSTABLE SEAT
Filed Dec. 29, 1926
2 Sheets-Sheet 1
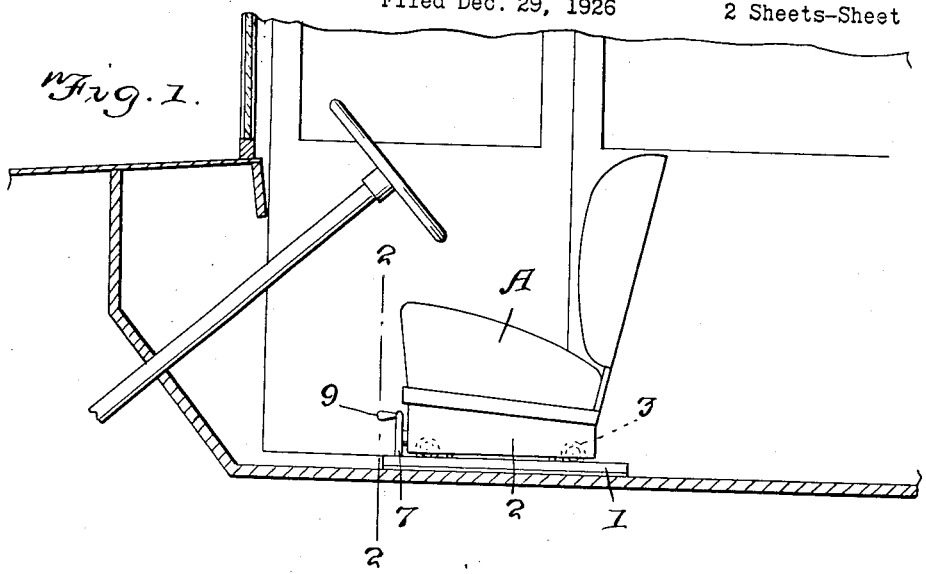
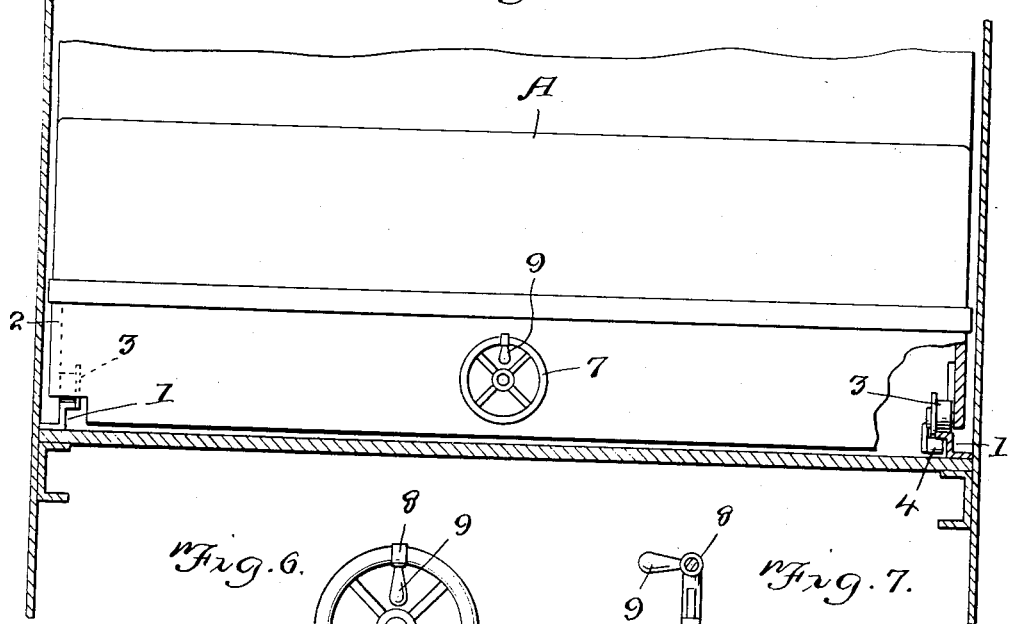
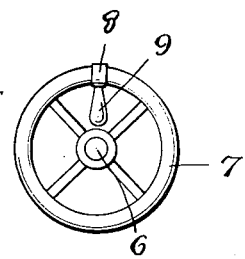
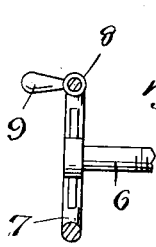
C. A. Anderson
INVENTOR
BY Victor J. Evans
ATTORNEY Nov. 27, 1928.
C. A. ANDERSON
1,693,427
ADJUSTABLE SEAT
Filed Dec. 29, 1926      2 Sheets-Sheet 2
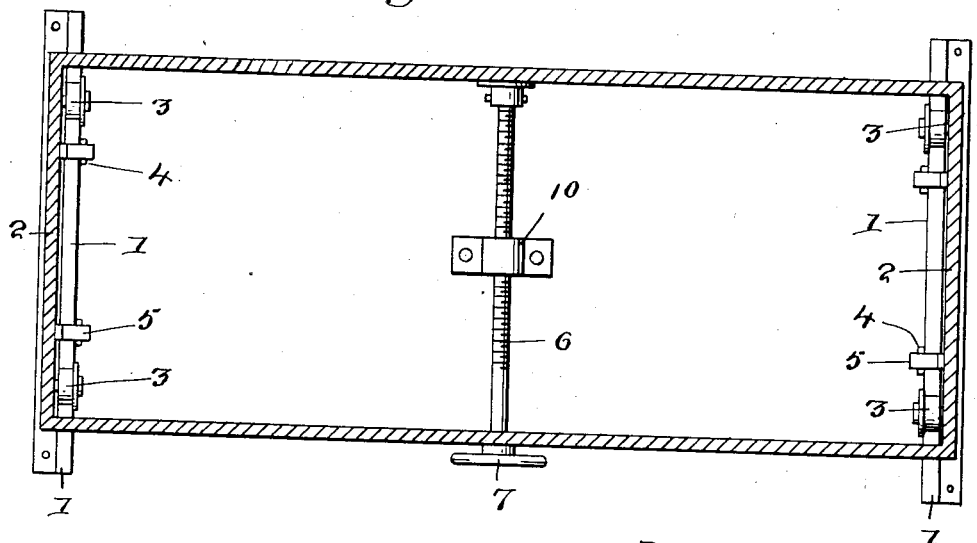
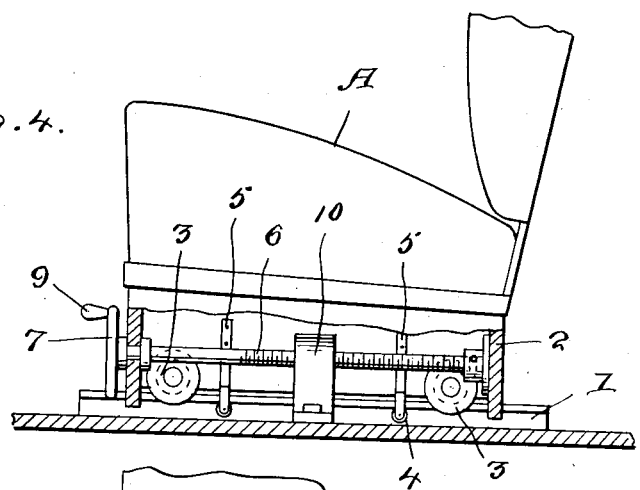
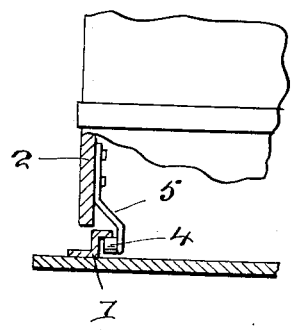

Patented Nov. 27, 1928.

1,693,427

UNITED STATES PATENT OFFICE.

CARL A. ANDERSON, OF IRWIN, PENNSYLVANIA.

ADJUSTABLE SEAT.

Application filed December 29, 1926. Serial No. 157,848.

This invention relates to an adjustable seat for a motor vehicle, the general object of the invention being to provide means whereby the driver's seat can be adjusted relative to the steering wheel so that the driver can position himself so that he can manipulate the wheel and the pedals without difficulty.

Another object of the invention is to provide a base for the seat which is provided with rollers for engaging a track on the floor of the vehicle so that the base can be moved toward and away from the front of the vehicle, with means for locking the base in adjusted position.

This invention also consists in certain other features of construction and in the combination and arangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view through portion of a vehicle, showing the invention in use.

Figure 2 is a section on line 2—2 of Figure 1, with parts broken away.

Figure 3 is a horizontal sectional view through the base.

Figure 4 is an end view of the seat with parts broken away.

Figure 5 is a fragmentary view, partly in section, showing the means for holding the base against upward movement.

Figures 6 and 7 are views showing how the handle is attached to the wheel for rotating the shaft.

In these views, 1 indicates a pair of Z-shaped rails which are fastened to the floor of a vehicle adjacent the front doors thereof and 2 indicates a casing-like base for the driver's seat A of the vehicle. If desired, this seat can be hinged to the base so that it can be tilted forwardly in the usual manner.

This base carries the flanged wheels 3 which engage the rails 1, with their flanges engaging the inner edges of the rails so that lateral movement of the base is prevented.

Rollers 4 are attached to the sides of the base by the hangers 5 in such a manner that the rollers engage an under face of each rail so that the base is held to the rails and cannot be lifted therefrom. A screw shaft 6 is rotatably mounted at the center of the base with one end extending through the front thereof where it is provided with a wheel 7 which has a groove in its rim for receiving a collar 8 which carries a handle 9 so that when the handle is extended horizontally, as shown in Figures 1, 4 and 7, the shaft can be turned by one gripping the handle with one hand. Then by permitting the handle to drop to the position it occupies in Figure 6, the handle will lie within the circumference of the wheel and thus be out of the way. The threaded part of the shaft passes through a threaded opening in a bracket 10 which is secured to the floor of the vehicle and lies within the base so that as the shaft is turned, it will be caused to move longitudinally through the bracket and thus the base with the seat thereon will be adjusted toward or away from the steering wheel.

From the foregoing it will be seen that I have provided simple means for moving the driver's seat toward or away from the steering wheel so that the driver can place the seat in the most advantageous position for enabling him to reach the steering wheel, the pedals and the shifting lever. The screw shaft and the bracket having the threaded hole for receiving the same acts to lock the parts in adjusted position and the handle 9 enables the shaft to be easily rotated when moved to a horizontal position.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

- In a motor vehicle, a track connected with the floor thereof and formed of Z-shaped rails, a base for the driver's seat of the vehicle, hangers connected with the base, rollers at the lower ends of the hangers engaging under faces of the rails, flanged wheels carried by the base and engaging the upper faces of the rails with the flanges engaging the inner edges of the rails, a screw shaft carried by the base and having one end extending through the front thereof, a bracket on the floor of the vehicle having a threaded hole therein through which the shaft passes and a handle on the outer end of the shaft for rotating the same.

In testimony whereof I affix my signature.

CARL A. ANDERSON.